US012772204B2

(12) United States Patent
Liu et al.

(10) Patent No.: US 12,772,204 B2
(45) Date of Patent: Oct. 20, 2026

(54) MULTICAST DOWNLINK SERVICE NOTIFICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Jianhua Liu, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 423 days.

(21) Appl. No.: 17/984,830

(22) Filed: Nov. 10, 2022

(65) Prior Publication Data

US 2023/0070801 A1 Mar. 9, 2023

Related U.S. Application Data

(63) Continuation of application No. PCT/CN2020/089884, filed on May 12, 2020.

(51) Int. Cl.

| | |
|---|---|
| ***H04W 68/02*** | (2009.01) |
| ***H04W 4/06*** | (2009.01) |
| ***H04W 76/19*** | (2018.01) |
| ***H04W 76/28*** | (2018.01) |

(52) U.S. Cl.

CPC ............. *H04W 68/02* (2013.01); *H04W 4/06* (2013.01); *H04W 76/19* (2018.02); *H04W 76/28* (2018.02)

(58) Field of Classification Search

CPC ..... H04W 68/02; H04W 68/06; H04W 76/19; H04W 76/28; H04W 4/06

See application file for complete search history.

(56) References Cited

U.S. PATENT DOCUMENTS

2004/0180675 A1* 9/2004 Choi ..................... H04W 72/30 455/458
2012/0093052 A1* 4/2012 Kang ................ H04W 52/0216 370/311
2013/0301515 A1 11/2013 Kim et al.
2014/0010141 A1* 1/2014 Kim ........................ H04W 4/06 370/312
2014/0140261 A1* 5/2014 Kim ...................... H04W 76/40 370/312

(Continued)

FOREIGN PATENT DOCUMENTS

CN 1510940 A 7/2004
CN 1567773 A 1/2005

(Continued)

OTHER PUBLICATIONS

First Office Action issued in corresponding Indian application No. 202227067370, mailed Jan. 30, 2023.

(Continued)

*Primary Examiner* — Hassan A Phillips
*Assistant Examiner* — Sang C Lee
(74) *Attorney, Agent, or Firm* — BAYES PLLC

(57) ABSTRACT

A multicast downlink service notification method includes: receiving, by a terminal device, a paging message, wherein the paging message is used for notifying presence of multicast downlink data; and responding, by the terminal device, to the paging message.

15 Claims, 10 Drawing Sheets

(56) References Cited

U.S. PATENT DOCUMENTS

| | | | | |
|---|---|---|---|---|
| 2018/0049156 | A1* | 2/2018 | Laha | H04W 76/28 |
| 2018/0249479 | A1* | 8/2018 | Cho | H04W 12/086 |
| 2018/0352389 | A1* | 12/2018 | Fujishiro | H04W 52/02 |
| 2018/0376444 | A1* | 12/2018 | Kim | H04W 76/30 |
| 2019/0158985 | A1* | 5/2019 | Dao | H04W 28/04 |
| 2019/0223250 | A1* | 7/2019 | Dao | H04W 72/23 |
| 2020/0178343 | A1* | 6/2020 | Kim | H04W 76/27 |
| 2020/0351984 | A1* | 11/2020 | Talebi Fard | H04W 76/40 |
| 2021/0345438 | A1* | 11/2021 | Dao | H04W 76/34 |
| 2021/0352615 | A1* | 11/2021 | Luo | H04W 68/02 |
| 2022/0322285 | A1* | 10/2022 | Xu | H04W 76/28 |

FOREIGN PATENT DOCUMENTS

| | | | |
|---|---|---|---|
| CN | 101039503 | A | 9/2007 |
| CN | 101185283 | A | 5/2008 |
| CN | 101483811 | A | 7/2009 |
| CN | 101483812 | A | 7/2009 |
| CN | 101796856 | A | 8/2010 |
| CN | 104247470 | A | 12/2014 |
| CN | 108934067 | A | 12/2018 |
| CN | 109429185 | A | 3/2019 |
| EP | 3393175 | A1 | 10/2018 |
| JP | 2004187279 | A | 7/2004 |
| WO | 2019137546 | A1 | 7/2019 |
| WO | 2019216730 | A1 | 11/2019 |
| WO | 2019221530 | A1 | 11/2019 |
| WO | 2020036460 | A1 | 2/2020 |

OTHER PUBLICATIONS

Extended European Search Report issued in corresponding European application No. 20935482.8, mailed May 12, 2023.

First Office Action issued in corresponding Japanese application No. 2022-568984, mailed Jan. 26, 2024.

First Office Opinion Notice issued in corresponding Chinese Application No. 202310258213.3, mailed Jul. 24, 2024, 20 pages.

Request for the Submission of an Opinion issued in corresponding Korean Application No. 10-2022-7041349, mailed on Aug. 24, 204, 13 pages.

Second Office Action issued in corresponding European application No. 20935482.8, mailed Apr. 19, 2024.

Second Office Action issued in corresponding Japanese application No. 2022-568984, mailed Jun. 28, 2024.

Priority Review issued in corresponding Chinese application No. 202310258213.3, mailed Jul. 1, 2024.

LG Electronics, "New MBS architecture and procedures", S2-2000350, SA WG2 Meeting #136AH Jan. 13-17, 2020, Incheon, Korea.

Qualcomm Incorporated, "5G Mbs baseline architecture", S2-2000265, SA WG2 Meeting #136AH Incheon, Rep. Of Korea, Jan. 13-17, 2020.

International Search Report issued in International application No. PCT/CN2020/089884, mailed Feb. 18, 2021.

Written Opinion of the International Searching Authority issued in International application No. PCT/CN2020/089884, mailed Feb. 18, 2021.

3GPP TS 23.502 V16.4.0 (Mar. 2020); Technical Specification Group Services and System Aspects; Procedures for the 5G System (5GS); Stage 2 (Release 16).

3GPP TS 38.304 V16.0.0 (Mar. 2020); Technical Specification Group Radio Access Network; NR; User Equipment (UE) procedures in Idle mode and RRC Inactive state (Release 16).

Nokia et al., "RANAP changes to support paging optimisation", R3-091012, 3GPP TSG-RAN WG3 Meeting #63bis Seoul, Korea, Mar. 23-27, 2009.

OPPO, "Solution for MBS session deactivation and activation", SA WG2 Meeting #S2-139E Jun. 1-12, 2020, Electronic, Elbonia.

3GPP TS 38.300 V17.0.0 (Mar. 2022); Technical Specification Group Radio Access Network; NR; NR and NG-RAN Overall Description; Stage 2 (Release 17).

3GPP TS 38.413 V17.0.0 (Apr. 2022); Technical Specification Group Radio Access Network; NG-RAN; NG Application Protocol (NGAP) (Release 17).

3GPP TS 38.304 V17.0.0 (Mar. 2022); Technical Specification Group Radio Access Network; NR; User Equipment (UE) procedures in Idle mode and RRC Inactive state (Release 17).

3GPP TS 38.331 V17.0.0 (Mar. 2022); Technical Specification Group Radio Access Network; NR; Radio Resource Control (RRC) protocol specification (Release 17).

First Office Action issued in corresponding European application No. 20935482.8, mailed Oct. 11, 2023.

The Second Office Action issued in corresponding Chinese Application No. 202310258213.3, mailed Oct. 29, 2024, 12 pages.

Communication under Rule 71(3) EPC (Notice of Allowance) issued in corresponding European Application No. 20 935 482.8-1218, mailed Oct. 18, 2024, 51 pages.

Decision to Grant a Patent issued in corresponding Japanese Application No. 2022-568984, mailed Nov. 26, 2024, 6 pages.

"Mobile Communication Networking and Optimization", Editor Yang Guorong, Xi'an Railway Vocational & Technical Institute 2022.8, http: //www.xatzy.com, 20 pages.

Zhao, Zhifeng et al., " Principle and Implementation of Narrow Band Internet of Things Technology", Zhejiang University Press, dated Jan. 23, 2025, 10 pages.

Third Office action issued in corresponding Chinese Application No. 202310258213.3, dated Feb. 5, 2025, 16 pages.

* cited by examiner

MULTICAST DOWNLINK SERVICE NOTIFICATION METHOD, TERMINAL DEVICE AND NETWORK DEVICE

CROSS-REFERENCE TO RELATED APPLICATION

This application is a continuation of International Application No. PCT/CN2020/089884, filed May 12, 2020, entitled "MULTICAST DOWNLINK SERVICE NOTIFICATION METHOD, TERMINAL DEVICE AND NETWORK DEVICE," which is hereby incorporated by reference in its entirety.

TECHNICAL FIELD

This application relates to the field of communications, and more specifically, to a notification method for multicast downlink service, a terminal device, and a network device.

BACKGROUND

In the 5G system, a point-to-multipoint transmission mechanism is to be introduced. In the network architecture of this transmission mechanism, the network side sends downlink data within an area of the multicast/broadcast service by means of the point-to-multipoint transmission mechanism. Terminal devices in this area can receive data through multicast/broadcast channels.

In the data interface, that is N3 interface, between the core network and RAN, a UE-specific N3 channel may be used, and unicast data and multicast/broadcast data for a certain UE are all transmitted in this specific channel. It is also possible to use a shared transmission channel, which is shared by multiple terminal devices for data transmission, and the multiple terminal devices may belong to the same group.

In order to save the overhead of network resource, when there is no downlink data, the terminal device will be in an idle state. When a certain group of downlink multicast/broadcast data arrives, a notification mechanism is required to notify the terminal device of arrival of the downlink data. At present, there is no mechanism to notify a certain group of terminal devices of the arrival of downlink multicast/broadcast data.

SUMMARY

Embodiments of the application provide a notification method for multicast downlink service, a terminal device, and a network device to solve the technical problem as mentioned above.

Some embodiments of the application propose a notification method for multicast downlink service, including:

receiving, by a terminal device, a paging message, where the paging message is used for notifying presence of multicast downlink data; and responding, by the terminal device, to the paging message.

Some embodiments of the application propose a notification method for multicast downlink service, including:

sending, by a first network device, a paging message, where the paging message is used for notifying presence of multicast downlink data.

Some embodiments of the application propose a notification method for multicast downlink services, including:

sending, by a second network device, a paging request message to a first network device, where the paging request message carries at least one of: group information of a group to which multicast downlink data belongs, relevant MBS session information, identity information and DRX information of at least one terminal device to be paged, a group-specific DRX cycle, and a group-specific identity.

Some embodiments of the application propose a notification method for multicast downlink services, including:

sending, by a third network device to a second network device, a first arrival message related to multicast downlink data or an MBS session, or terminal information related to the multicast/MBS session, where the first arrival message carries group information of a group to which the multicast downlink data belongs and/or relevant MBS session information.

Some embodiments of the application propose a notification method for multicast downlink services, including:

sending, by a fourth network device to a third network device, a second arrival message of multicast/MBS session downlink data, where the second arrival message of the multicast/MBS session downlink data carries group information of a group to which the multicast downlink data belongs and/or MBS session information relevant to the group to which the multicast downlink data belongs.

Some embodiments of the application propose a terminal device, including:

a paging message receiving module, configured to receive a paging message, where the paging message is used for notifying presence of multicast downlink data; and a responding module, configured to respond to the paging message.

Some embodiments of the application propose a network device, including:

a paging message sending module, configured to send a paging message, where the paging message is used for notifying presence of multicast downlink data.

Some embodiments of the application propose a network device, including:

a paging request message sending module, configured to send a paging request message to a first network device, where the paging request message carries at least one of: group information of a group to which multicast downlink data belongs, relevant MBS session information, identity information and DRX information of at least one terminal device to be paged, a group-specific DRX cycle, and a group-specific identity.

Some embodiments of the application propose a network device, including:

a first notifying module, configured to send to a second network device a first arrival message related to multicast downlink data or an MBS session, or terminal information related to the multicast/MBS session, where the first arrival message carries group information of a group to which the multicast downlink data belongs and/or relevant MBS session information.

Some embodiments of the application propose a network device, including:

a second notifying module, configured to send to a third network device a second arrival message of multicast/MBS session downlink data, where the second arrival message of the multicast/MBS session downlink data carries group information of a group to which the multicast downlink data belongs and/or MBS session information relevant to the group to which the multicast downlink data belongs.

Some embodiments of the application propose a terminal device, including: a processor and a memory, where the memory is configured to store a computer program, and the processor is configured to call and run the computer program stored in the memory, thereby implementing the method according to any embodiments of the notification method for multicast downlink services as described above.

Some embodiments of the application propose a network device, including: a processor and a memory, where the memory is configured to store a computer program, and the processor is configured to call and run the computer program stored in the memory, thereby implementing the method according to any embodiments of the notification method for multicast downlink services as described above.

Some embodiments of the application propose a chip including: a processor, configured to call and run a computer program from a memory, thereby causing a device installed with the chip to implement the method according to any embodiments of the notification method for multicast downlink services as described above.

Some embodiments of the application propose a chip including: a processor, configured to call and run a computer program from a memory, thereby causing a device installed with the chip to implement the method according to any embodiments of the notification method for multicast downlink services as described above.

Some embodiments of the application propose a computer-readable storage medium, storing a computer program that enables a computer to implement the method according to any embodiments of the notification method for multicast downlink services as described above.

Some embodiments of the application propose a computer-readable storage medium, storing a computer program that enables a computer to implement the method according to any embodiments of the notification method for multicast downlink services as described above.

Some embodiments of the application propose a computer program product, including computer program instructions that cause a computer to implement the method according to any embodiments of the notification method for multicast downlink services as described above.

Some embodiments of the application propose a computer program product, including computer program instructions that cause a computer to implement the method according to any embodiments of the notification method for multicast downlink services as described above.

Some embodiments of the application propose a computer program, causing a computer to implement the method according to any embodiments of the notification method for multicast downlink services as described above.

Some embodiments of the application propose a computer program, causing a computer to implement the method according to any embodiments of the notification method for multicast downlink services as described above.

According to the method proposed by some embodiments of the application, the network device sends a paging message to the terminal device, where the paging message is used for notifying the terminal device of presence of multicast downlink data, so as to notify a certain group of terminal devices of the arrival of downlink multicast/broadcast data.

DETAILED DESCRIPTION

Figure 1:
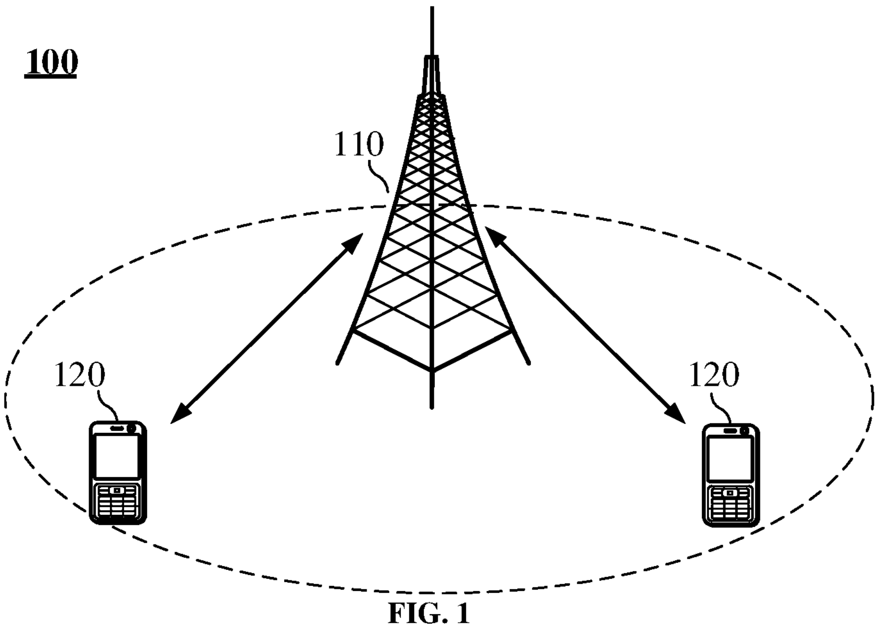
FIG. 1 is a schematic diagram of an application scenario according to some embodiments of the application.

The technical solutions according to some embodiments of the application will be described below in conjunction with the drawings according to some embodiments of the application.

It should be noted that the terms "first", "second" and the like in the claims and description according to some embodiments of the application and the above-mentioned drawings are used to distinguish similar objects, and are not necessarily used to describe a specific sequence or order. Additionally, the objects described by "first" and "second" may be the same or different.

The technical solutions according to some embodiments of this application can be applied to various communication systems, such as global system of mobile (GSM) communication system, code division multiple access (CDMA) system, wideband code division multiple access (WCDMA) system, general packet radio service (GPRS), long term evolution (LTE) system, advanced long term evolution (LTE-A) system, new radio (NR) system, evolution system of the NR system, LTE-based access to unlicensed spectrum (LTE-U) system, NR-based access to unlicensed spectrum (NR-U) system, universal mobile telecommunication system (UMTS), wireless local area network (WLAN), wireless fidelity (WiFi), 5th-generation (5G) system or other communication systems.

Generally speaking, traditional communication systems support a limited number of connections and are easy for implementation. However, with the development of communication technology, mobile communication systems will not only support traditional communication, but also support, for example, device to device (D2D) communication, machine to machine (M2M) communication, machine type communication (MTC), vehicle to vehicle (V2V) communication, and the like. Embodiments of this application can also be applied to these communications system.

Optionally, the communication system in some embodiments of the application can be applied to a carrier aggregation (CA) scenario, can also be applied to a dual connectivity (DC) scenario, and can also be applied to a standalone (SA) network deployment scenario.

Embodiments of the application do not limit the applied frequency spectrum. For example, some embodiments of this application can be applied to licensed spectrum or unlicensed spectrum.

Some embodiments of this application describe various examples in combination with network device and terminal device. The terminal device may also be referred to as user equipment (UE), access terminal, subscriber unit, subscriber station, mobile station, mobile site, remote station, remote terminal, mobile device, user terminal, terminal device, wireless communication device, user agent, user device, or the like. The terminal device may be a station (ST) in WLAN, a cellular phone, a cordless phone, a session initiation protocol (SIP) phone, a wireless local loop (WLL) station, a personal digital assistant (PDA) device, a handheld device with wireless communication capabilities, a computing device or other processing devices connected to wireless modems, a vehicle-mounted device, a wearable device, or a terminal device in the next-generation communication system, such as the NR network or the future-evolved public land mobile network (PLMN).

As an example without limitation, in some embodiments of the application, the terminal device may also be a wearable device. The wearable device can also be called a wearable smart device, which is a general term for those wearable devices that are intelligently developed and design based on everyday wear using wearable technology, such as glasses, gloves, watches, clothing, shoes and the like. The wearable device is a portable device that is directly worn on the body or integrated into the user's clothes or accessories. The wearable device is not only a kind of hardware device, but also able to realize powerful functions through software support, data interaction, and cloud interaction. In a broad sense, the wearable smart device is characterized in full feature, large size, provided with complete or partial functions that can be achieved without relying on smart phones, and includes, for example, smart watches or smart glasses. Also, the wearable smart device may focus on a certain type of application function, and need to cooperate with other devices such as smart phones for usage, and includes, for example, all kinds of smart bracelets and smart jewelry for physical sign monitoring.

The network device may be a device configured to communicate with mobile devices. The network device may be an access point (AP) in WLAN, a base transceiver station (BTS) in GSM or CDMA, or a NodeB (NB) in WCDMA, or an evolutional Node B (eNB or eNodeB) in LTE, or a relay station or access point, or a vehicle-mounted device, or a wearable device, or a network device (gNB) in the NR network, or a network device in the future-evolved PLMN.

In some embodiments of the application, the network device provides services for the cell, and the terminal device communicates with the network device through transmission resources (e.g., frequency domain resources or spectrum resources) used by the cell, and the cell may correspond to a network device (e.g., a base station). The cell may belong to a macro base station or a base station corresponding to a small cell. The small cell here may include a metro cell, a micro cell, a pico cell, a femto cells, and the like. These small cells have the characteristics of small coverage and low transmit power, and are suitable for providing high-rate data transmission services.

FIG. 1 exemplarily shows one network device 110 and two terminal devices 120. Optionally, the wireless communication system 100 may include multiple network devices 110, and the coverage of each network device 110 may include other numbers of terminal device 120, which are not limited in the embodiments of the application. Some embodiments of the application may be applied between one terminal device 120 and one network device 110, and may also be applied between one terminal device 120 and another terminal device 120.

Optionally, the wireless communication system 100 may also include other network entities such as a mobility management entity (MME), an access and mobility management function (AMF) and the like, which is not limited in the embodiments of the application.

It should be understood that the terms "system" and "network" in this disclosure are often used interchangeably in this disclosure. The term "and/or" in this disclosure indicates an association relationship describing the associated objects, which means that there may be three relationships. For example, A and/or B may mean three situations: A exists alone, both A and B exist, B exist alone. In addition, the character "/" in this disclosure generally indicates that the associated objects before and after are in an "or" relationship.

Figure 2:
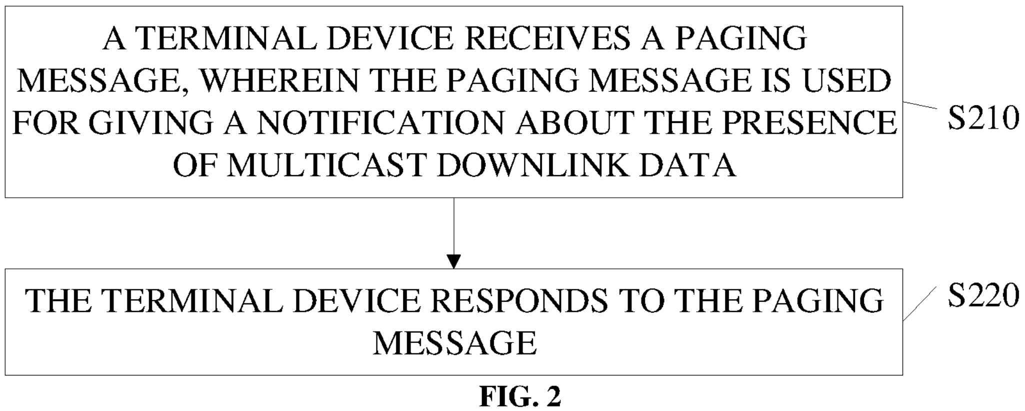
FIG. 2 is an implementation flowchart of a multicast downlink service notification method 200 according to some embodiments of the application.

Some embodiments of the application propose a multicast downlink service notification method. FIG. 2 is an implementation flowchart of a multicast downlink service notification method 200 according to some embodiments of the application. The method may optionally be applied to the system shown in FIG. 1, for example, applied to the terminal device, but is not limited thereto. The method includes at least part of the following content.

In S210, the terminal device receives a paging message, where the paging message is used for notifying presence of multicast downlink data.

In S220, the terminal device responds to the paging message.

Optionally, the above-mentioned paging message carries at least one of: group information of a group to which the multicast downlink data belongs, relevant multicast broadcast service (MBS, or broadcast can multicast service) session information, and indication information of MBS service updating.

The terminal device determines whether the paging message or a relevant system information block (SIB) of MBS service updating carries information of an interesting group of the terminal device, and if yes, responds to the paging message.

In some embodiments, responding to the paging message includes: activating a relevant MBS session or initiating a radio resource control (RRC) resume procedure.

In some embodiments, activating the relevant MBS session includes:

activating, by the terminal device, the relevant MBS session by entering a connected state from an idle state and sending a non-access stratum (NAS) message.

In some embodiments, the terminal device initiates the RRC resume procedure when it is in an inactive state.

In some embodiments, the above method further includes:

receiving, by the terminal device, a group-specific discontinuous reception (DRX) cycle and a group-specific identity.

Optionally, the group-specific identity includes a radio network temporary identity (RNTI).

In some embodiments, the above method further includes:

determining, by the terminal device, a group-specific paging occasion (PO) according to the group-specific DRX cycle and the group-specific identity; and monitoring, by the terminal device, the paging message on the group-specific PO.

Alternatively, in some embodiments, the terminal device monitors the paging message on an MBS-specific PO.

Optionally, the terminal device calculates the specific PO according to an MBS-specific identity and DRX.

In some embodiments, the MBS-specific identity and DRX are defined in a protocol, or broadcasted by an access network in system information, or configured for the terminal device by a core network through a NAS message.

In some embodiments, the terminal device determines the group-specific PO by using following formulas:

$$(\text{SFN}+\text{PF\_offset}) \bmod T=(T \text{ div } N)*(\text{Group\_ID} \bmod N); \text{ and}$$

$$i\_s=\text{floor}(\text{Group\_ID}/N) \bmod Ns;$$

where SFN corresponds to a paging frame (PF);

PF_offset refers to an offset of the PF;

mod represents a remainder operation;

T is the group-specific DRX cycle;

div represents a rounding division operation;

N is a number of paging frames during T;

Group_ID is the group-specific identity or a pre-configured value for representing multicast;

i_s represents an identity of the group-specific PO;

floor represents a downward rounding operation; and

Ns represents a number of PO in one PF.

In some embodiments, the foregoing method further includes: receiving, by the terminal device, the multicast downlink data by means of the MBS session.

In some embodiments, the foregoing method further includes: negotiating, by the terminal device, the group-specific DRX cycle with a network device.

Optionally, the terminal device negotiates the group-specific DRX cycle with the network device during a registration procedure and/or an MBS session establishment procedure.

The main process of the multicast downlink service notification method applied to the terminal device according to embodiments of the application is described in detail below with reference to the drawings and some embodiments of the application.

In Embodiment 1, the multicast downlink data arrives at a radio access network (RAN), and the RAN pages all terminal devices.

Key technical points are described as follows:

multicast downlink data, for example, MBS data, arrives at the RAN through a group-dedicated N3 channel;

RAN initiates paging, and the paging message carries group information of the group to which the multicast downlink data belongs, or relevant MBS session information, for example, group identity information;

if a system information block (SIB) carries notification mechanism information, the paging message may carry indication information of MBS service updating, for example, specific SIB update indication information;

RAN sends paging messages on all POs; the terminal device receives the paging message according to an existing PO calculation manner. If the paging message or the SIB carries information of an interesting group, it enters the connected state and initiates a service request to activate the MBS session of the group, thereby receiving downlink data.

According to the above-mentioned embodiments, the impact on irrelevant terminal devices is reduced, and there is no storage requirement for group information on the RAN side.

Figure 3:
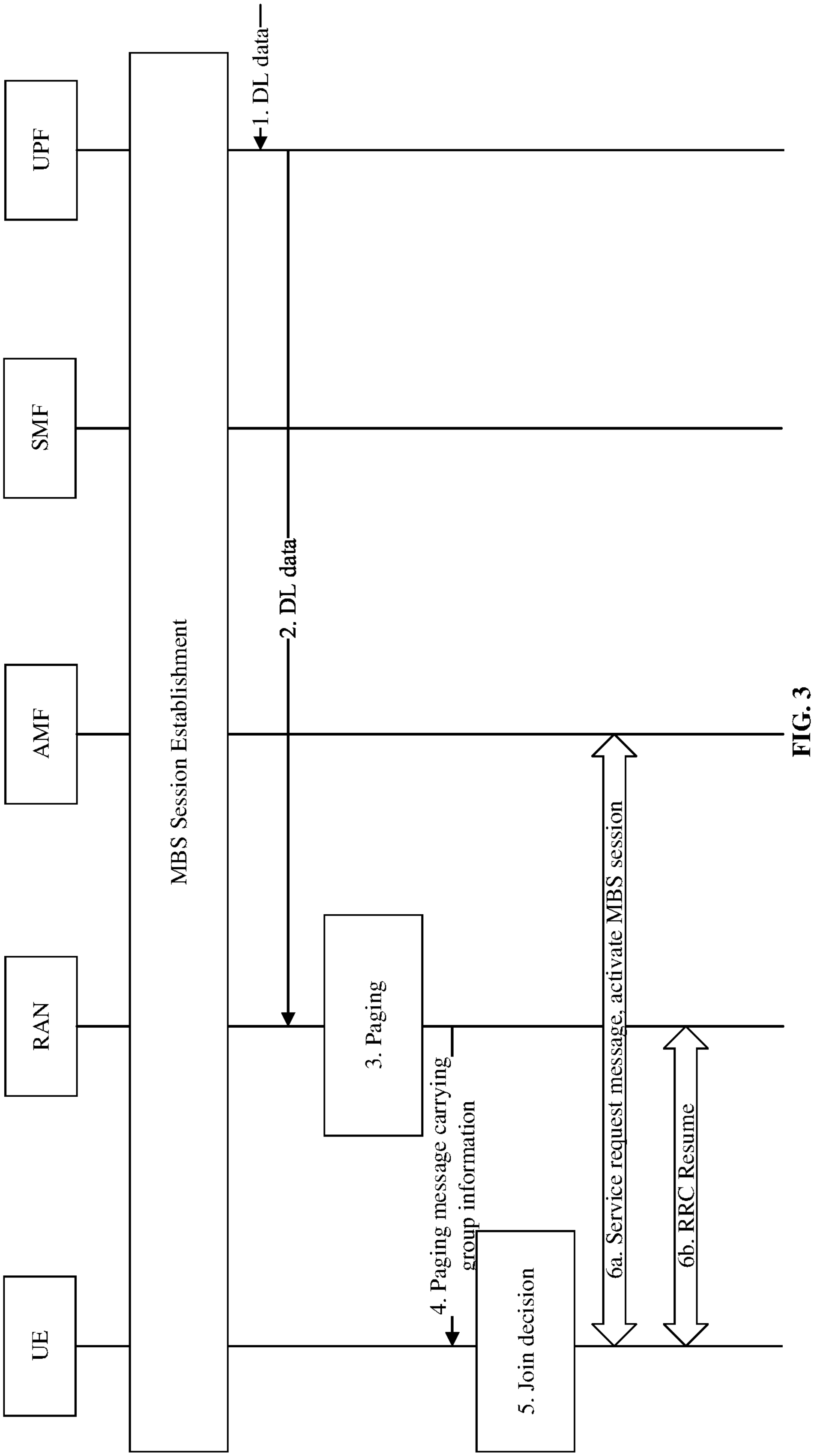
FIG. 3 is an implementation flow chart according to the first embodiment of the application.

FIG. 3 is a schematic diagram of specific steps of some embodiments, including the following steps:

1, MBS data arrives at the user plane function (UPF);

2, UPF sends the MBS data to an RAN node on the N3 channel of the group data;

3, the RAN node determines the group information corresponding to the MBS data according to N3 channel information; the RAN sends a paging message, which is a paging message sent to the entire cell;

4, the paging message carries group-related information or relevant MBS session information, such as a group identity, a group radio network temporary identity (RNTI) message, and the like; alternatively, the paging message may carry whether an MBS-related SIB initiates an update;

5, after receiving the paging message, the terminal device determines whether the group information in the paging message corresponds to the group in which it is currently interested; or whether the MB S-related SIB carries the information of the group in which the terminal device is interested;

6a, if the terminal device is interested in the group information in step 5 or the group information updated in the relevant SIB, and the terminal device is in the idle state, the terminal device enters the connected state and initiates a NAS message to activate the MBS session; optionally, the NAS message is a service request message;

6b, if the terminal device is interested in the group information in step 5 or the group information updated in the relevant SIB, and the terminal device is in an inactive state, the terminal device initiates an RRC resume procedure;

if the terminal device is not interested in the group service described in step 5, the terminal device ignores this paging message.

In Embodiment 2, the multicast downlink data arrives at the RAN, and the RAN paging the terminal device in the group.

Key technical points are described as follows.

multicast downlink data arrives at the RAN through the group-dedicated N3 channel;

RAN determines a terminal device that needs to be paged according to a previously-configured correspondence between groups and terminal devices; calculates a PO corresponding to the terminal device that needs to be paged by using an existing PO calculation manner; and sends the paging message on the PO, where the paging message carries multicast indication information;

if notification mechanism information is carried in an SIB, a specific SIB update indication information may be carried in the paging message;

the terminal device receives the paging message or SIB information, and enters the connected state according to the indication information therein;

the terminal device initiates a service request to activate the MBS Session of the notified group;

or,

RAN calculates a group-specific PO according to a group-specific DRX cycle and a group ID, and sends a paging message on this PO, where the paging message carries multicast indication information;

the terminal device calculates the group-specific PO based on the group-specific DRX and group ID, and monitors paging on this PO; if the paging message carries information about a group of interest, the terminal device enters the connected state to receive multicast data;

if notification mechanism information is carried in an SIB, the specific SIB update indication information may be carried in the Paging;

the terminal device initiates a service request to activate the MBS Session of the notified group.

According to this embodiment, the overhead of paging is reduced, and a new RAN side behavior or PO calculation manner is introduced.

Figure 4:
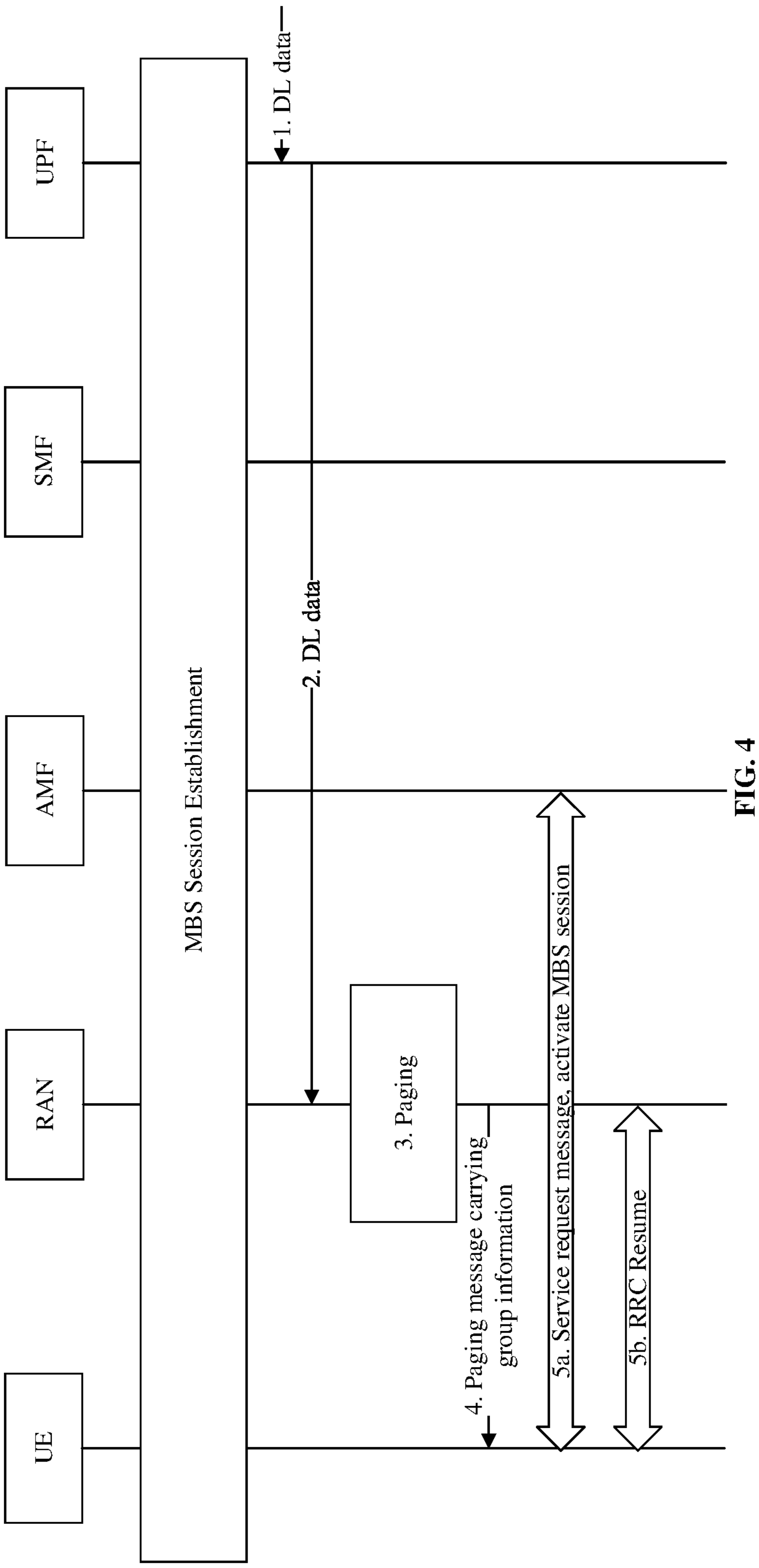
FIG. 4 is an implementation flow chart according to the second embodiment of the application.

FIG. 4 is a schematic diagram of specific steps of this embodiment, including the following steps:

1, MBS data arrives at UPF;

2, UPF sends the MBS data to the RAN node on the N3 channel of the group of data;

There are two ways to deal with the next steps.

The first one includes the following steps 3, 4, 5a, 5b:

3, the RAN node determines the group information to which the downlink data belongs according to the N3 channel information; the RAN determines the terminal device to be paged according to the group information and the relationship between the group and group members (terminal devices) obtained previously;

4, the RAN node sends a paging message to the determined terminal device to be paged, where the paging message optionally carries group-related information or relevant MBS session information, such as group identity information and group-related RNTI information;

5a, after the terminal device receives the paging message, if the terminal device is in an idle state, the terminal device initiates a NAS message to enter the connected state to receive downlink data; and 5b, after the terminal device receives the paging message, if the terminal device is in an inactive state, the terminal device initiates the RRC resume procedure.

The RAN side may start a timer, and after the timer expires, it starts to send downlink data through multicast.

Optionally, the RAN node starts a timer upon sending the paging message to a first one terminal device, sending the paging message to a last one terminal device, or receiving a response to the paging message from the first one terminal device.

Optionally, the RAN node receives the above-mentioned timer configured by the core network when the MBS session is established.

The second way includes the following steps 3', 4', 5a', 5b':

3', the RAN node determines the group information to which the downlink data belongs according to the N3 channel information; and the RAN calculates the paging occasion according to the group-specific DRX information and/or group identity information. Specifically, the calculation formula may be as follows:

$$(\text{SFN}+\text{PF\_offset}) \bmod T=(T \operatorname{div} N)*(\text{Group\_ID} \bmod N); \text{ and}$$

PF_offset refers to an offset of the PF;

mod represents a remainder operation;

T is the group-specific DRX cycle;

div represents a rounding division operation;

N is a number of paging frames during T;

Group_ID is the group-specific identity or a pre-configured value for representing multicast;

and $$i\_s=\text{floor}(\text{Group\_ID}/N) \bmod Ns;$$

where i_s represents an identity of the group-specific PO;

Ns represents a number of PO in one PF; and

Group_ID may be group identity information configured by the network side, for example, RNTI and the like;

4', the network sends a paging message to the terminal device, optionally, the paging message carries group information or relevant MBS session information. The terminal device calculates the paging occasion according to the calculation formula described in step 3' and monitors the paging message;

5a', if the terminal device receives the paging message and the terminal device is in an idle state, the terminal device activates the MBS session of the group, for example, initiates a service request message;

further, the terminal device may determine whether it is a group of interest according to the group information or relevant MBS session information in the paging message, and decide whether to enter the connected state;

5b', if the terminal device receives the paging message and the terminal device is in an inactive state, the terminal device initiates the RRC connection resume procedure;

further, the terminal device may determine whether it is a group of interest according to the group information or relevant MBS session information in the paging message, and decide whether to enter the connected state.

In addition, some embodiments of the application also propose a negotiation and configuration procedure for the group-specific DRX. Optionally, the terminal device negotiates the group-specific DRX with the network during the registration procedure of the terminal device. Alternatively, the group-specific DRX is negotiated during the establishment of the MBS session. For example, AMF or SMF configures a specific group-specific DRX to the terminal device according to the group that the terminal device is interested in or joins. When the MBS session is established, the core network configures this information to the RAN.

In Embodiment 3, the multicast downlink data arrives at the core network, and the core network pages all terminal devices.

Key technical points are described as follows:

multicast downlink data arrives at UPF;

UPF notifies the session management function (SMF) of the arrival of downlink data, carrying group information or relevant MBS session information;

SMF notifies the access and mobility management function (AMF) of the arrival of downlink data, carrying the group information or relevant MBS session information;

AMF initiates a paging request to RAN, carrying the group information or relevant MBS session information;

RAN initiates paging, with the paging message carrying the group information or relevant MBS session information, such as group identity information;

RAN sends paging messages on all POs; the terminal device calculates its corresponding PO through an existing PO calculation manner, and receives the paging message on the PO. If the paging message carries information about a group of interest, the terminal device enters the connected state, initiates a service request to activate the MBS session of the group and receives downlink data.

Figure 5:
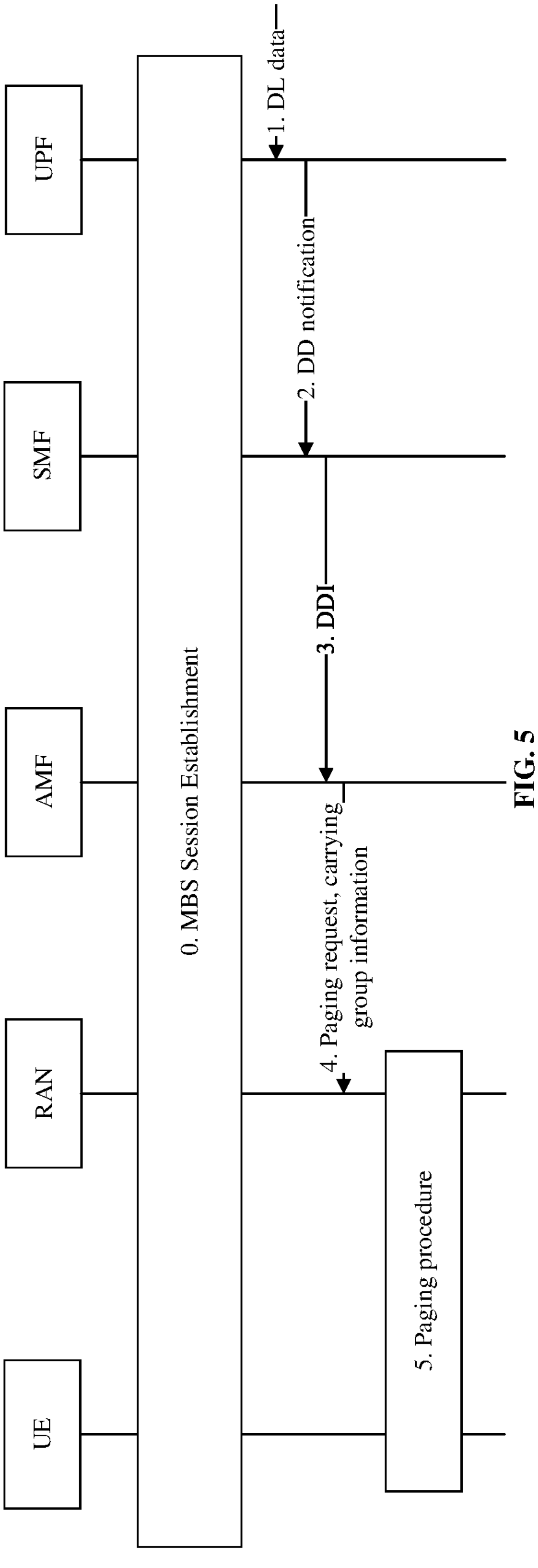
FIG. 5 is an implementation flow chart according to the third embodiment of the application.

FIG. 5 is a schematic diagram of specific steps of this embodiment, including the following steps:

0, MBS session establishment procedure;

1, multicast downlink data arrives at UPF, and UPF determines the group or MBS session to which the data belongs according to the channel or \IP\ address information where the downlink data arrives;

2, UPF notifies SMF of the arrival of multicast downlink data, carrying group information of the group to which the multicast downlink data belongs or relevant MBS session information, such as identity information;

3, SMF notifies AMF of the arrival of multicast downlink data, carrying group information of the group to which the multicast downlink data belongs or relevant MBS session information, such as identity information;

4. AMF initiates a paging request message to RAN, carrying group information of the group to which the multicast downlink data belongs or relevant MBS session information;

5. RAN initiates a paging message to the terminal device. The specific implementation process may refer to steps 4, 5, and 6 in Embodiment 1, which will not be repeated here.

In Embodiment 4, multicast downlink data arrives at the core network, and the core network pages the terminal device in the group.

Key technical points are described as follows:

multicast downlink data arrives at UPF;

UPF notifies SMF of the arrival of downlink data, carrying group information or relevant MBS session information;

SMF notifies AMF of the arrival of downlink data, carrying group information or relevant MBS session information;

AMF selects the terminal device to be paged according to the relationship between the terminal device and the group negotiated during the registration procedure; optionally, the relationship between the terminal device and the group may come from SMF;

AMF initiates a paging request to RAN, carrying group information or relevant MBS session information, and list information of the terminal device(s) to be paged;

RAN initiates paging to the terminal device(s) in the list, and the paging message may carry group information or relevant MBS session information, such as group identity information;

the terminal device receives paging according to the existing PO calculation manner. If the paging message carries information of a group of interest, the terminal device enters the connected state and initiates a service request to activate the MBS session of the group and receives downlink data;

or,

AMF initiates a paging request to RAN, carrying group information, group-specific DRX information; where the group-specific DRX is negotiated between the terminal device and AMF during the registration procedure;

RAN calculates group-specific PO based on the group-specific DRX and ID, and sends paging on this PO, which carries multicast indication information;

if notification mechanism information is carried in the SIB, the specific SIB update indication information may be carried in the Paging;

RAN calculates the group-specific PO according to the group-specific DRX and group ID, and monitors paging on this PO; if the paging message carries the information of a group of interest or the SIB carries the group information, it enters the connected state to receive the multicast data;

the terminal device initiates a service request to activate the MBS session of the notified group.

Figure 6:
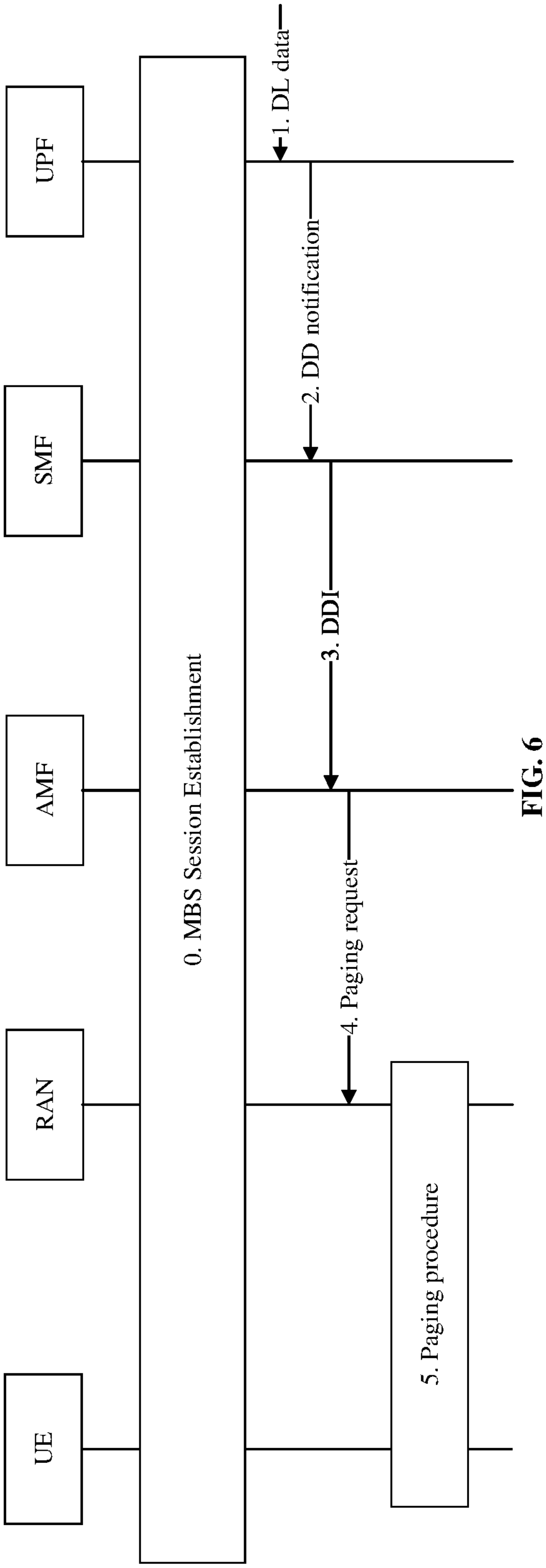
FIG. 6 is an implementation flow chart according to the fourth embodiment of the application.

FIG. 6 is a schematic diagram of specific steps of this embodiment, including the following steps:

0, MBS session establishment procedure;

1, the multicast downlink data arrives at UPF, and UPF determines the group or MBS session to which it belongs according to the channel or \IP\ address information where the downlink data arrives;

2. UPF notifies SMF of the arrival of multicast downlink data, carrying group information of the group to which the multicast downlink data belongs or relevant MBS session information, such as identity information.

There are two ways to deal with the next steps.

The first one includes the following steps 3, 4, and 5:

3, SMF notifies AMF of the arrival of multicast downlink data, carrying group information of the group to which the multicast downlink data belongs or relevant MBS session information, such as identity information. Further, SMF notifies AMF of terminal information (e.g., identity information) in the group, such as the subscription concealed identifier (SUCI) information of the terminal device, the 5G globally unique temporary UE identifier (GUTI) information and the like;

4, AMF determines the terminal device to be paged according to the group information provided by SMF and a saved correspondence between the terminal device and the group. AMF initiates a paging request message to RAN, carrying the identity information of the terminal device to be paged and the DRX information of the terminal device. Further, AMF sends the terminal information in the registration area where RAN is located. For example, RAN1 is in registration area 1, RAN2 is in registration area 2, UE1 and UE2 are located in registration area 1, and UE3 and UE4 are located in registration area, then the paging message sent by AMF to RAN1 carries information of UE1 and UE2; and the paging message sent to RAN2 carries information of UE3 and UE4.

Alternatively, AMF determines the terminal device to be paged according to the terminal information in the group provided by SMF in step 3.

5, RAN initiates a paging message to the terminal device. The specific implementation process is described as steps 3, 4, and 5 in Embodiment 2, which will not be repeated here.

The second type includes the following steps 3', 4', 5':

3', SMF notifies AMF of the arrival of multicast downlink data, carrying group information of the group to which the multicast downlink data belongs or relevant MBS session information;

4', AMF initiates a paging request message to RAN according to the group information or MBS session information provided by SMF, carrying the group/MBS session information that needs to be paged, such as identity information and/or DRX information;

5', RAN initiates a paging message to the terminal device, and the specific implementation process is described as the steps 3', 4', and 5' in Embodiment 2.

This embodiment also proposes a negotiation and configuration method for Group DRX. Optionally, DRX is negotiated with the network during the registration process of the terminal device; or negotiated during establishment of the MBS session. Specifically, AMF or SMF configures a specific DRX to the terminal device according to the group that the terminal device is interested in or joins.

Figure 7:
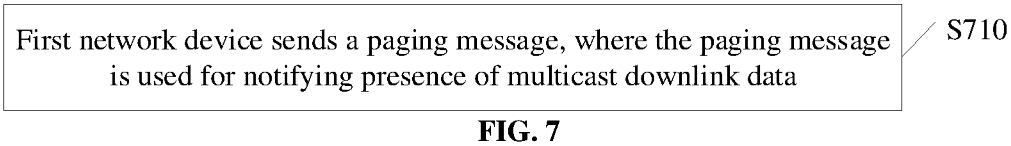
FIG. 7 is an implementation flowchart of a multicast downlink service notification method 700 according to some embodiments of the application.

Some embodiments of the application also propose a multicast downlink service notification method, which is applied to a first network device. Optionally, the first network device is an RAN device. FIG. 7 is an implementation flowchart of a multicast downlink service notification method 700 according to some embodiments of the application, including a following step.

In S710, the first network device sends a paging message, where the paging message is used for notifying presence of multicast downlink data.

In some embodiments, the first network device sends the paging message on all POs.

In some embodiments, the first network device determines a terminal device to be paged according to group information of a group to which the multicast downlink data belongs/relevant MBS session information, and a correspondence between the group/MBS session and the terminal device.

In some embodiments, the first network device determines a group-specific PO according to a group-/MBS session-specific DRX cycle and a group-specific identity/MBS session identity; and sends the paging message on the group-/MBS session-specific PO.

Optionally, the first network device sends the paging message on an MBS-specific PO.

Optionally, the first network device calculates the specific PO according to an MBS-specific identity and DRX.

In some embodiments, the paging message carries at least one of: group information of a group to which the multicast downlink data belongs, relevant MBS session information, and indication information of MBS service updating.

Optionally, the group-specific identity/MBS session identity includes an RNTI.

In some embodiments, the first network device determines the group-specific PO by using following formulas:

$$(SFN+PF\_offset) \bmod T = (T \operatorname{div} N)*(Group\_ID \bmod N); \text{ and}$$

$$i\_s = \operatorname{floor}(Group\_ID/N) \bmod Ns;$$

where SFN corresponds to a paging frame (PF);

PF_offset refers to an offset of the PF;

mod represents a remainder operation;

T is the group-specific DRX cycle;

div represents a rounding division operation;

N is a number of paging frames during T;

Group_ID is the group-specific identity or a pre-configured value for representing multicast;

i_s represents an identity of the group-specific PO;

floor represents a downward rounding operation; and

Ns represents a number of PO in one PF.

In some embodiments, the first network device determines the group information of the group to which the multicast downlink data belongs or the relevant MBS session information according to information of N3 channel, and the N3 channel is a channel used for receiving the multicast downlink data or the MBS session.

Optionally, the method further includes:

receiving, by the first network device, a paging request message from a second network device, where the paging request message carries identity information and DRX information of at least one terminal device to be paged;

the identity information and the DRX information of the terminal device are used for determining a PO corresponding to the terminal device to be paged.

Optionally, the method further includes:

receiving, by the first network device, a message from a second network device, where the message carries a group-/MBS session-specific DRX cycle and a group-/MBS session-specific identity.

Optionally, the message is a paging request message.

Optionally, the message is an N2 message for establishing a connection of the multicast/MBS session service.

In some embodiments, the method further includes:

receiving, by the first network device, a paging request message from a second network device, where the paging request message carries group information of a group to which the multicast downlink data belongs and/or relevant MBS session information.

In some embodiments, the method further includes:

starting, by the first network device, a timer upon sending the paging message to a first one terminal device, sending the paging message to a last one terminal device, or receiving a response to the paging message from the first one terminal device; and sending the multicast downlink data when the timer expires.

In some embodiments, the method further includes: receiving the timer configured by a core network upon establishing the MBS session.

Figure 8:
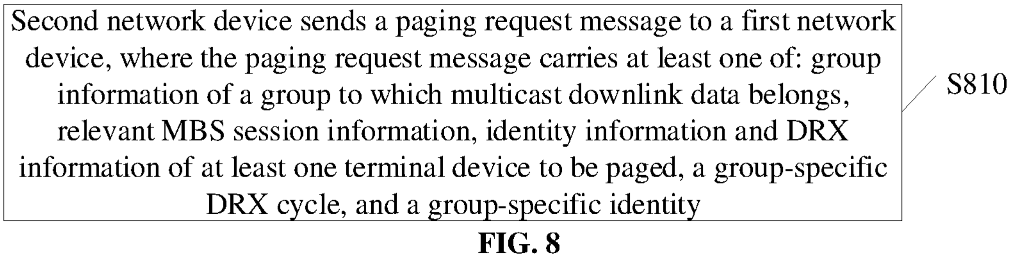
FIG. 8 is an implementation flowchart of a multicast downlink service notification method 800 according to some embodiments of the application.

Some embodiments of the application also propose a multicast downlink service notification method, which is applied to a second network device. Optionally, the second network device is an AMF. FIG. 8 is an implementation flow chart of a multicast downlink service notification method 800 according to some embodiments of the application, including a following step.

In S810, the second network device sends a paging request message to a first network device, where the paging request message carries at least one of: group information of a group to which multicast downlink data belongs, relevant MBS session information, identity information and DRX information of at least one terminal device to be paged, a group-specific DRX cycle, and a group-specific identity.

Optionally, the terminal device to be paged includes a terminal device registered in a registration area where the first network device is located.

In some embodiments, the method further includes:

receiving, by the second network device, the group information of the group to which the multicast downlink data belongs and/or the relevant MBS session information from a third network device; and determining the terminal device to be paged according to the group information of the group to which the multicast downlink data belongs/the relevant MBS session information, and a correspondence between the group/MBS session and the terminal device.

In some embodiments, the method further includes:

receiving, by the second network device, information of the terminal device to be paged from a third network device.

In some embodiments, the method further includes:

configuring, by the second network device, a group-/MBS session-specific DRX cycle to a terminal device according to a group/MBS session that the terminal device joins.

Optionally, the second network device configures the group-specific DRX cycle to the terminal device during a registration procedure of the terminal device and/or an MB S session establishment procedure.

Optionally, the method further includes: configuring, by the second network device, the group-/MBS session-specific DRX cycle to the first network device.

Optionally, the second network device configures the group-/MBS session-specific DRX cycle to the first network device during the MBS session establishment procedure.

Figure 9:
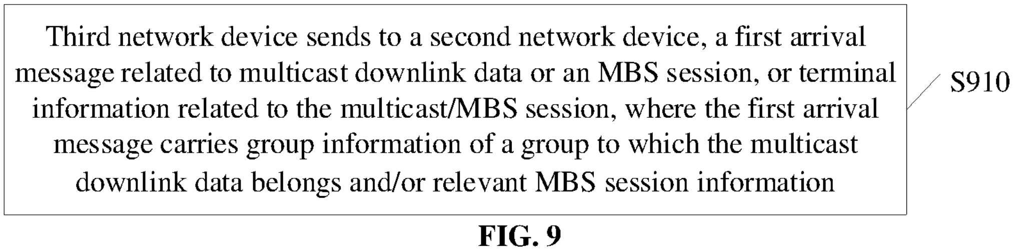
FIG. 9 is an implementation flowchart of a multicast downlink service notification method 900 according to some embodiments of the application.

Some embodiments of the application also propose a multicast downlink service notification method, which is applied to a third network device. Optionally, the third network device is an SMF. FIG. 9 is an implementation flowchart of a multicast downlink service notification method 900 according to some embodiments of the application, including a following step.

In S910, the third network device sends to a second network device, a first arrival message related to multicast downlink data or an MBS session, or terminal information related to the multicast/MBS session, where the first arrival message carries group information of a group to which the multicast downlink data belongs and/or relevant MBS session information.

In some embodiments, the method further includes:

configuring, by the third network device, a group-/MBS session-specific DRX cycle to a terminal device according to a group/MBS session that the terminal device joins.

In some embodiments, the third network device configures the group-/MBS session-specific DRX cycle to the terminal device during a registration procedure of the terminal device and/or an MBS session establishment procedure.

Optionally, the method further includes: configuring, by the third network device, the group-/MBS session-specific DRX cycle to the first network device.

Optionally, the third network device configures the group-/MBS session-specific DRX cycle to the first network device during the MBS session establishment procedure.

Figure 10:
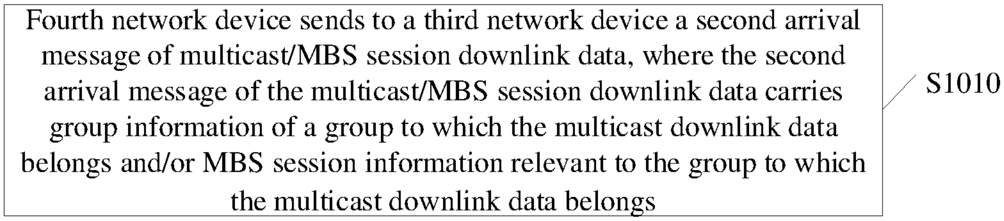
FIG. 10 is an implementation flowchart of a multicast downlink service notification method 1000 according to some embodiments of the application.

Some embodiments of the application also proposes a multicast downlink service notification method, which is applied to a fourth network device. Optionally, the fourth network device is a UPF. FIG. 10 is an implementation flowchart of a multicast downlink service notification method 1000 according to some embodiments of the application, including a following step.

In S1010, the fourth network device sends to a third network device a second arrival message of multicast/MBS session downlink data, where the second arrival message of the multicast/MBS session downlink data carries group information of a group to which the multicast downlink data belongs and/or MBS session information relevant to the group to which the multicast downlink data belongs.

In some embodiments, the method further includes:

determining, by the fourth network device, the group information of the group to which the multicast downlink data belongs and/or the MBS session information relevant to the group to which the multicast downlink data belongs according to at least one of a channel, IP information, and address information at which the multicast downlink data arrives.

Figure 11:
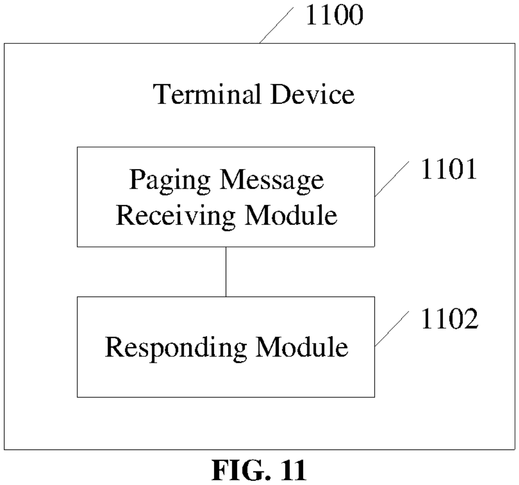
FIG. 11 is a block diagram of a terminal device 1100 according to some embodiments of the application.

Some embodiments of the application also propose a terminal device. FIG. 11 is a block diagram of a terminal device 1100 according to some embodiments of the application, including a paging message receiving module 1101 and a responding module 1102.

The paging message receiving module 1101 is configured to receive a paging message, where the paging message is used for notifying presence of multicast downlink data.

The responding module 1102 is configured to respond to the paging message.

Optionally, the paging message carries at least one of: group information of a group to which the multicast downlink data belongs, relevant multicast broadcast service (MBS) session information, and indication information of MBS service updating.

The responding module 1102 is configured to determine whether the paging message or a relevant system information block (SIB) of MBS service updating carries information of an interesting group of the terminal device, and if yes, respond to the paging message.

Optionally, responding to the paging message includes:

activating a relevant MBS session or initiating a radio resource control (RRC) resume procedure.

Optionally, activating the related MBS session includes:

activating, by the terminal device, the related MBS session by entering a connected state from an idle state and sending a non-access stratum (NAS) message.

Optionally, the terminal device initiates the RRC resume procedure in an inactive state.

Figure 12:
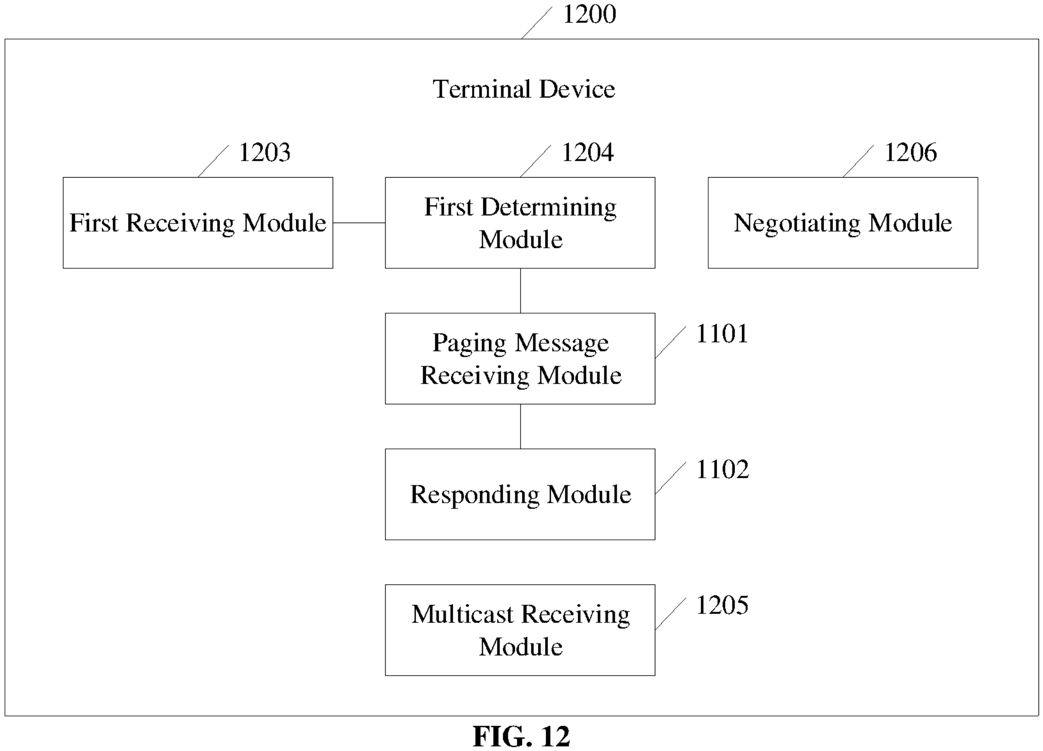
FIG. 12 is a block diagram of a terminal device 1200 according to some embodiments of the application.

As shown in FIG. 12, in some embodiments, the terminal device further includes:

a first receiving module 1203, configured to receive a group-specific discontinuous reception (DRX) cycle and a group-specific identity.

Optionally, the group-specific identity includes a radio network temporary identity (RNTI).

Optionally, the terminal device further includes:

a first determining module 1204, configured to determine a group-specific paging occasion (PO) according to the group-specific DRX cycle and the group-specific identity;

where the paging message receiving module 1101 is configured to monitor the paging message on the group-specific PO.

In some embodiments, the paging message receiving module 1101 is configured to monitor the paging message on an MBS-specific PO.

Optionally, the paging message receiving module 1101 is configured to calculate the specific PO according to an MBS-specific identity and DRX.

Optionally, the MBS-specific identity and DRX are defined in a protocol, or broadcasted by an access network in system information, or configured for the terminal device by a core network through a NAS message.

In some embodiments, the first determining module 1204 is configured to determine the group-specific PO by using following formulas:

$$(SFN+PF\_offset) \bmod T=(T \text{ div } N)*(Group\_ID \bmod N); \text{ and}$$

$$i\_s=\text{floor}(Group\_ID/N) \bmod Ns;$$

where SFN corresponds to a paging frame (PF);
PF_offset refers to an offset of the PF;
mod represents a remainder operation;
T is the group-specific DRX cycle;
div represents a rounding division operation;
N is a number of paging frames during T;
Group_ID is the group-specific identity or a pre-configured value for representing multicast;
i_s represents an identity of the group-specific PO;
floor represents a downward rounding operation; and
Ns represents a number of PO in one PF.

As shown in FIG. 12, in some embodiments, the terminal device further includes:

a multicast receiving module 1205, configured to receive the multicast downlink data by means of the MBS session.

In some embodiments, the terminal device negotiates the group-specific DRX cycle with a network device.

As shown in FIG. 12, in some embodiments, the terminal device further includes:

a negotiating module 1206, configured to negotiate the group-specific DRX cycle with the network device during a registration procedure and/or an MBS session establishment procedure.

It should be understood that the above-mentioned and other operations and/or functions of the modules in the terminal device according to some embodiments of the application are configured to implement the corresponding process of the terminal device in the method 200 of FIG. 2, which will not be repeated here for brevity.

Figure 13:
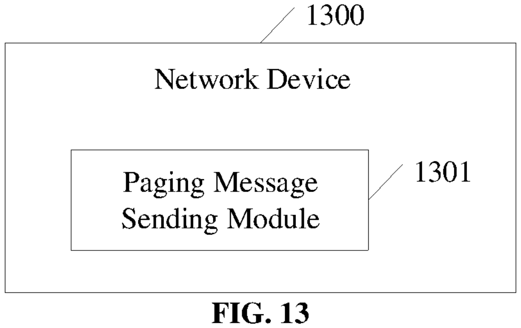
FIG. 13 is a block diagram of a network device 1300 according to some embodiments of the application.

Some embodiments of the application also propose a network device. The network device may be the first network device as described above. Optionally, the network device is an RAN device. FIG. 13 is a block diagram of a network device 1300 according to some embodiments of the application, including a paging message sending module 1301.

The paging message sending module 1301 is configured to send a paging message, where the paging message is used for notifying presence of multicast downlink data.

In some embodiments, the paging message sending module 1301 is configured to send the paging message on all POs.

Optionally, the network device determines a terminal device to be paged according to group information of a group to which the multicast downlink data belongs/relevant MBS session information, and a correspondence between the group/MBS session and the terminal device.

Optionally, the network device determines a group-specific PO according to a group-/MBS session-specific DRX cycle and a group-specific identity/MBS session identity.

The paging message sending module 1301 is configured to send the paging message on the group-/MBS session-specific PO.

In some embodiments, the paging message sending module 1301 is configured to send the paging message on an MBS-specific PO.

In some embodiments, the network device calculates the specific PO according to an MBS-specific identity and DRX.

In some embodiments, the paging message carries at least one of: group information of a group to which the multicast downlink data belongs, relevant MBS session information, and indication information of MBS service updating.

Optionally, the group-specific identity/MBS session identity includes an RNTI.

In some embodiments, the network device determines the group-specific PO by using following formulas:

$$(SFN+PF\_offset) \bmod T=(T \text{ div } N)*(Group\_ID \bmod N); \text{ and}$$

$$i\_s=\text{floor}(Group\_ID/N) \bmod Ns;$$

where SFN corresponds to a paging frame (PF);
PF_offset refers to an offset of the PF;
mod represents a remainder operation;
T is the group-specific DRX cycle;
div represents a rounding division operation;
N is a number of paging frames during T;
Group_ID is the group-specific identity or a pre-configured value for representing multicast;
i_s represents an identity of the group-specific PO;
floor represents a downward rounding operation; and
Ns represents a number of PO in one PF.

In some embodiments, the network device determines the group information of the group to which the multicast downlink data belongs or the relevant MBS session information according to information of N3 channel, and the N3 channel is a channel used for receiving the multicast downlink data or the MBS session.

Figure 14:
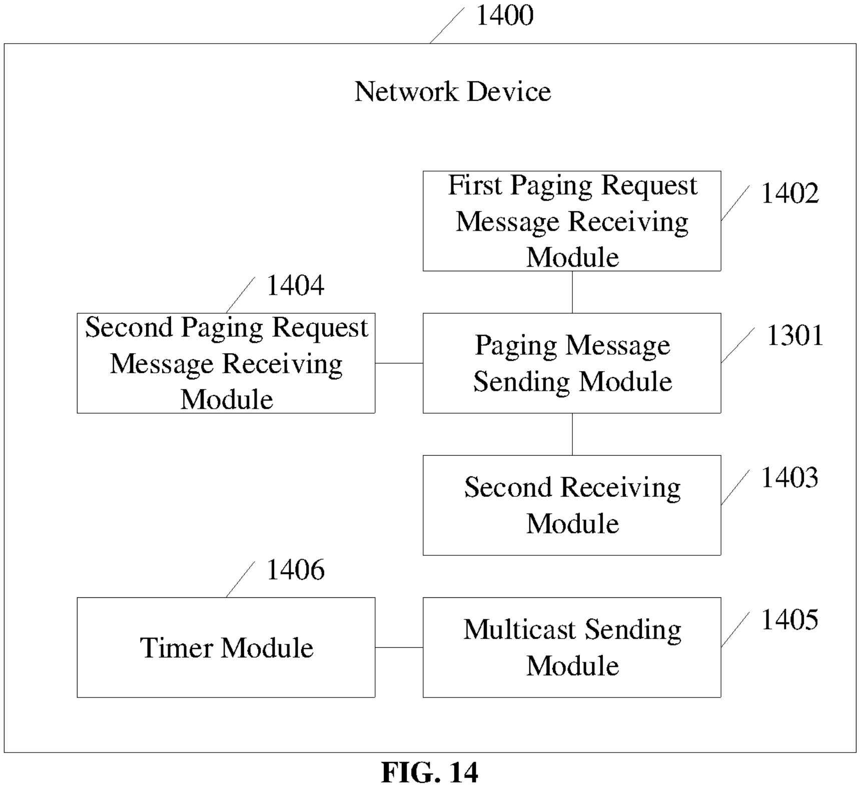
FIG. 14 is a block diagram of a network device 1400 according to some embodiments of the application.

As shown in FIG. 14, in some embodiments, the network device further includes:

a first paging request message receiving module 1402, configured to receive a paging request message from a second network device, where the paging request message carries identity information and DRX information of at least one terminal device to be paged;

the identity information and the DRX information of the terminal device are used for determining a PO corresponding to the terminal device to be paged.

In some embodiments, the network device further includes:

a second receiving module 1403, configured to receive a message from a second network device, where the message carries a group-/MBS session-specific DRX cycle and a group-/MBS session-specific identity.

Optionally, the message is a paging request message.

In some embodiments, the message is an N2 message for establishing a connection of the multicast/MBS session service.

In some embodiments, the network device further includes:

a second paging request message receiving module 1404, configured to receive a paging request message from a second network device, where the paging request message carries group information of a group to which the multicast downlink data belongs and/or relevant MBS session information.

In some embodiments, the network device further includes:

a multicast sending module 1405, configured to start a timer upon sending the paging message to a first one terminal device, sending the paging message to a last one terminal device, or receiving a response to the paging message from the first one terminal device; and send the multicast downlink data when the timer expires.

In some embodiments, the network device further includes:

a timer module 1406, configured to receive the timer configured by a core network upon establishing the MBS session.

It should be understood that the above-mentioned and other operations and/or functions of the modules in the network device according to some embodiments of the application are configured to implement the corresponding process of the network device in the method 700 of FIG. 7, which will not be repeated here for brevity.

Figure 15:
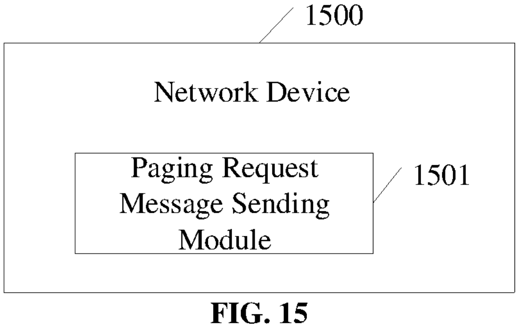
FIG. 15 is a block diagram of a network device 1500 according to some embodiments of the application.

Some embodiments of the application also propose a network device. The network device may be the second network device as described above. Optionally, the network device is an AMF. FIG. 15 is a block diagram of a network device 11500 according to some embodiments of the application, including a paging request message sending module 1501.

The paging request message sending module 1501 is configured to send a paging request message to a first network device, wherein the paging request message carries at least one of: group information of a group to which multicast downlink data belongs, relevant MBS session information, identity information and DRX information of at least one terminal device to be paged, a group-specific DRX cycle, and a group-specific identity.

In some embodiments, the terminal device to be paged includes a terminal device registered in a registration area where the first network device is located.

Figure 16:
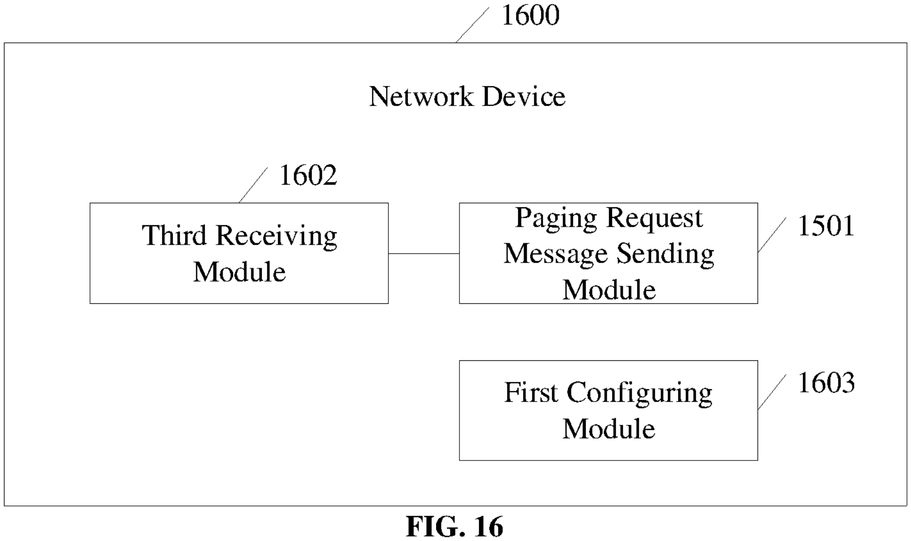
FIG. 16 is a block diagram of a network device 1600 according to some embodiments of the application.

As shown in FIG. 16, in some embodiments, the network device further includes:

a third receiving module 1602, configured to receive the group information of the group to which the multicast downlink data belongs and/or the relevant MBS session information from a third network device; and the paging request message sending module 1501 is configured to determine the terminal device to be paged according to the group information of the group to which the multicast downlink data belongs/the relevant MBS session information, and a correspondence between the group/MBS session and the terminal device.

In some embodiments, the third receiving module 1602 is further configured to receive information of the terminal device to be paged from a third network device.

In some embodiments, the network device further includes:

a first configuring module 1603, configured to configure a group-/MBS session-specific DRX cycle to a terminal device according to a group/MBS session that the terminal device joins.

Optionally, the first configuring module 1603 is configured to configure the group-specific DRX cycle to the terminal device during a registration procedure of the terminal device and/or an MBS session establishment procedure.

Optionally, the first configuring module 1603 is further configured to configure the group-/MBS session-specific DRX cycle to the first network device.

Optionally, the first configuring module 1603 is configured to configure the group-/MBS session-specific DRX cycle to the first network device during the MBS session establishment procedure.

It should be understood that the above-mentioned and other operations and/or functions of the modules in the network device according to some embodiments of the application are configured to implement the corresponding process of the network device in the method 800 of FIG. 8, which will not be repeated here for brevity.

Figure 17:
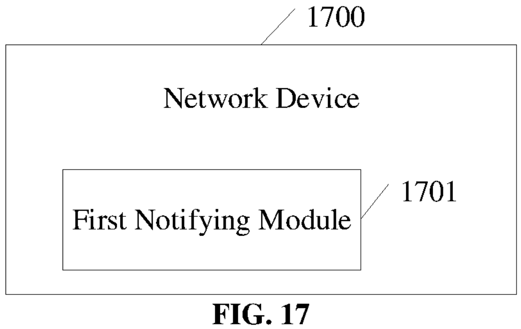
FIG. 17 is a block diagram of a network device 1700 according to some embodiments of the application.

Some embodiments of the application also propose a network device. The network device may be the third network device as described above. Optionally, the network device is an SMF. FIG. 17 is a block diagram of a network device 1700 according to some embodiments of the application, including a first notifying module 1701.

The first notifying module 1701 is configured to send to a second network device a first arrival message related to multicast downlink data or an MBS session, or terminal information related to the multicast/MBS session, wherein the first arrival message carries group information of a group to which the multicast downlink data belongs and/or relevant MBS session information.

Figure 18:
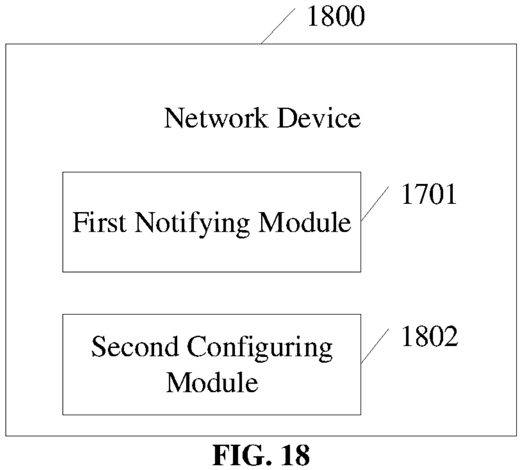
FIG. 18 is a block diagram of a network device 1800 according to some embodiments of the application.

As shown in FIG. 18, in some embodiments, the network device further includes:

a second configuring module 1802, configured to configure a group-/MBS session-specific DRX cycle to a terminal device according to a group/MBS session that the terminal device joins.

Optionally, the second configuring module 1802 is configured to configure the group-/MBS session-specific DRX cycle to the terminal device during a registration procedure of the terminal device and/or an MBS session establishment procedure.

Optionally, the second configuring module 1802 is further configured to configure the group-/MBS session-specific DRX cycle to the first network device.

In some embodiments, the second configuring module 1802 is configured to configure the group-/MBS session-specific DRX cycle to the first network device during the MBS session establishment procedure.

It should be understood that the above-mentioned and other operations and/or functions of the modules in the network device according to some embodiments of the application are configured to implement the corresponding process of the network device in the method 900 of FIG. 9, which will not be repeated here for brevity.

Figure 19:
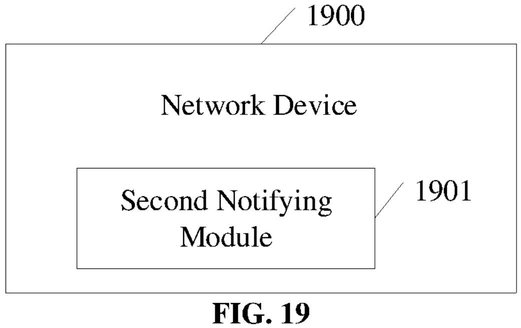
FIG. 19 is a block diagram of a network device 1900 according to some embodiments of the application.

Some embodiments of the application also propose a network device. The network device may be the fourth network device as described above. Optionally, the network device is a UPF. FIG. 19 is a block diagram of a network device 1900 according to some embodiments of the application, including a second notifying module 1901.

The second notifying module 1901 is configured to send to a third network device a second arrival message of multicast/MBS session downlink data, wherein the second arrival message of the multicast/MBS session downlink data carries group information of a group to which the multicast downlink data belongs and/or MBS session information relevant to the group to which the multicast downlink data belongs.

Figure 20:
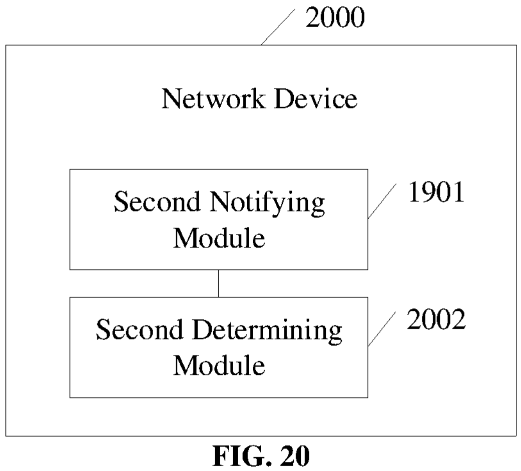
FIG. 20 is a block diagram of a network device 2000 according to some embodiments of the application.

As shown in FIG. 20, in some embodiments, the network device further includes:

a second determining module 2002, configured to determine the group information of the group to which the multicast downlink data belongs and/or the MBS session information relevant to the group to which the multicast downlink data belongs according to at least one of a channel, IP information, and address information at which the multicast downlink data arrives.

It should be understood that the above-mentioned and other operations and/or functions of the modules in the network device according to some embodiments of the application are configured to implement the corresponding process of the network device in the method 1000 of FIG. 10, which will not be repeated here for brevity.

Figure 21:
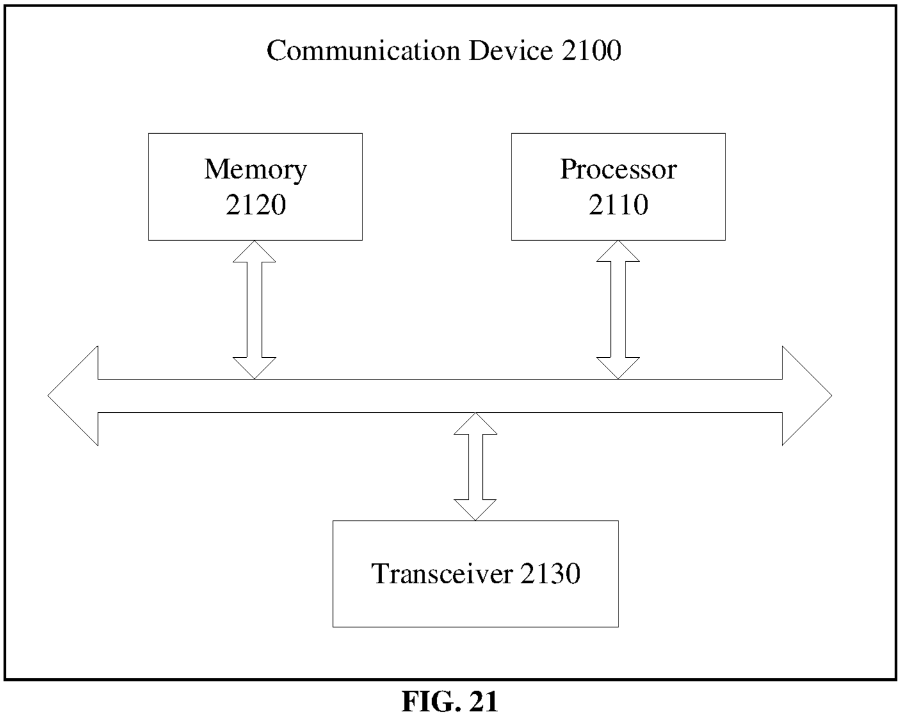
FIG. 21 is a block diagram of a communication device 2100 according to some embodiments of the application.

FIG. 21 is a block diagram of a communication device 2100 according to some embodiments of the application. The communication device 2100 shown in FIG. 21 includes a processor 2110, and the processor 2110 may call and run a computer program from a memory to implement the method in some embodiments of the application.

Optionally, as shown in FIG. 21, the communication device 2100 may further include a memory 2120. The processor 2110 may call and run a computer program from the memory 2120 to implement the method in some embodiments of the application.

The memory 2120 may be a separate device independent of the processor 2110, or may be integrated in the processor 2110.

Optionally, as shown in FIG. 21, the communication device 2100 may further include a transceiver 2130, and the processor 2110 may control the transceiver 2130 to communicate with other devices, for example, to send information or data to other devices, or to receive information or data sent by other devices.

In some embodiments, the transceiver 2130 may include a transmitter and a receiver. The transceiver 2130 may further include an antenna, and the number of antennas may be one or more.

Optionally, the communication device 2100 may be the terminal device according to some embodiments of the application, and the communication device 2100 may implement the corresponding process implemented by the terminal device in each method according to some embodiments of the application. For brevity, details are not repeated herein.

Optionally, the communication device 2100 may be the network device according to some embodiments of the application, and the communication device 2100 may implement corresponding processes implemented by the network device in each method according to some embodiments of the application. For brevity, details are not repeated herein.

Figure 22:
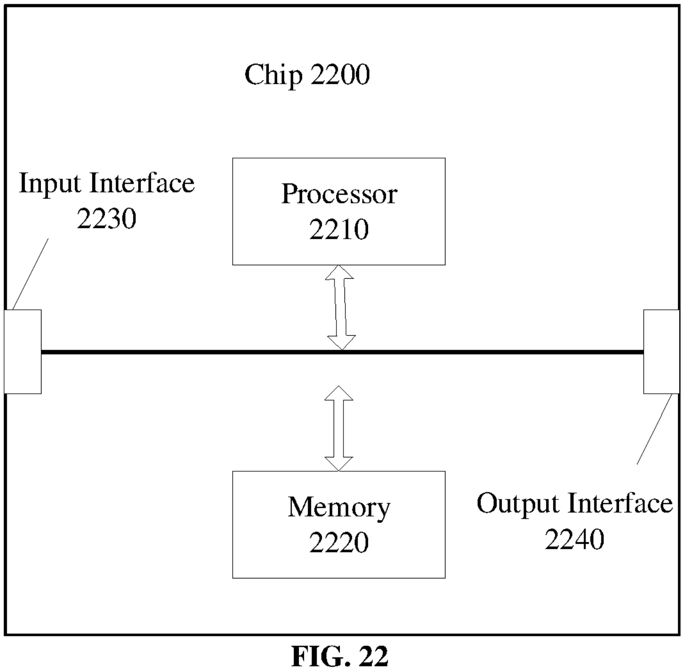
FIG. 22 is a block diagram of a chip 2200 according to some embodiments of the application.

FIG. 22 is a block diagram of a chip 2200 according to some embodiments of the application. The chip 2200 shown in FIG. 22 includes a processor 2210, and the processor 2210 may call and run a computer program from a memory to implement the method in some embodiments of the application.

Optionally, as shown in FIG. 22, the chip 2200 may further include a memory 2220. The processor 2210 may call and run a computer program from the memory 2220 to implement the method in some embodiments of the application.

The memory 2220 may be a separate device independent of the processor 2210, or may be integrated in the processor 2210.

Optionally, the chip 2200 may further include an input interface 2230. The processor 2210 may control the input interface 2230 to communicate with other devices or chips, and specifically, may obtain information or data sent by other devices or chips.

Optionally, the chip 2200 may further include an output interface 2240. The processor 2210 may control the output interface 2240 to communicate with other devices or chips, and specifically, may output information or data to other devices or chips.

Optionally, the chip may be applied to the terminal device in some embodiments of the application, and the chip may implement the corresponding process implemented by the terminal device in each method according to some embodiments of the application. For brevity, details are not repeated herein.

It should be understood that the chip mentioned in some embodiments of the application may also be referred to as a system-level chip, a system chip, a chip system, a system-on-chip, or the like.

The aforementioned processors may be general-purpose processors, digital signal processors (DSP), field programmable gate arrays (FPGAs), application specific integrated circuits (ASICs), or other programmable logic devices, transistor logic devices, discrete hardware components, and the like. Herein, the aforementioned general-purpose processor may be a microprocessor or any conventional processor.

The above-mentioned memory may be volatile memory or non-volatile memory, or may include both volatile and non-volatile memory. In some embodiments, the non-volatile memory may be read-only memory (ROM), programmable ROM (PROM), erasable PROM (EPROM), electrically EPROM (EEPROM) or flash memory. The volatile memory may be random access memory (RAM).

It should be understood that the foregoing memory is exemplary but not restrictive. For example, the memory in some embodiments of the application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), direct Rambus RAM (DR RAM) and the like. In other words, the memory in the embodiments of the application is intended to include, but is not limited to, these and any other suitable types of memory.

In the above embodiments, it may be implemented in whole or in part by software, hardware, firmware, or any combination thereof. When implemented by software, it may be implemented in the form of a computer program product in whole or in part. The computer program product includes one or more computer instructions. When the computer program instructions are loaded and executed on the computer, the processes or functions described in the embodiments of the application are generated in whole or in part. The computer may be a general-purpose computer, a special-purpose computer, a computer network, or other programmable devices. The computer instruction may be stored in a computer-readable storage medium, or transmitted from one computer-readable storage medium to another computer-readable storage medium. For example, the computer instruction may be transmitted from a website, computer, server, or data center through a wired manner (e.g., coaxial cable, optical fiber, digital subscriber line (DSL)) or a wireless manner (e.g., infrared, radio, microwave) to another website site, computer, server or data center. The computer-readable storage medium may be any available medium that may be accessed by a computer or a data storage device such as a server or data center integrated with one or more available media. The usable medium may be a magnetic medium (e.g., a floppy disk, a hard disk, and a magnetic tape), an optical medium (e.g., a DVD), or a semiconductor medium (e.g., a solid state disk (SSD)).

It should be understood that in the various embodiments of the application, the size of the sequence number of the above-mentioned processes does not mean the order of execution, and the execution order of each process should be determined by its function and internal logic, and should not constitute any limitation on the implementation process of the embodiments of the application.

Those skilled in the art may clearly understand that, for the convenience and conciseness of description, the specific working process of the system, device and unit described above may refer to the corresponding process in the foregoing method embodiments, which will not be repeated here.

The above are only specific implementations of this application, but the protection scope of this application is not limited to this. Any person skilled in the art may easily think of changes or substitutions within the technical scope disclosed in this application, which should fall within the protection scope of this application. Therefore, the protection scope of this application shall be subject to the protection scope of the claims.

What is claimed is:

1. A notification method for multicast downlink service, comprising:

receiving, by a terminal device at a paging occasion (PO), a first paging message sent by a radio access network (RAN) device, wherein the first paging message is used for notifying presence of multicast downlink data and carries relevant multicast broadcast service (MBS) session information; and responding, by the terminal device, to the first paging message, wherein the relevant MBS session information comprises group information updated in MBS-related system information block (SIB), and the method further comprises:

in response to being interested in the group information and being in an idle state, the terminal device entering a connected state and initiating a non-access stratum (NAS) message to activate an MBS session;

in response to being interested in the group information and being in an inactive state, the terminal device initiating a radio resource control (RRC) resume procedure; and in response to being not interested in the group information, the terminal device ignoring the first paging message;

wherein the PO is determined at the RAN device based on a second paging message sent from an access and mobility management function (AMF) device, wherein the second paging message carries a group-specific identity, a group-specific discontinuous reception (DRX) cycle, and the relevant MBS session information; the group-specific identity comprises a radio network temporary identity (RNTI), and the group-specific identity and the group-specific DRX cycle are used for determining the PO corresponding to the terminal device to be paged based on following formulas:

$$(SFN+PF\_offset) \bmod T=(T \text{ div } N)*(Group\_ID \bmod N); \text{ and}$$

$$i\_s=\text{floor}(Group\_ID/N) \bmod Ns;$$

where SEN corresponds to a paging frame (PF); PF_offset refers to an offset of the PE; mod represents a remainder operation; T is the group-specific DRX cycle; div represents a rounding division operation; N is a number of paging frames during T; Group_ID is the group-specific identity; i_s represents a group-specific PO identity; floor represents a downward rounding operation; and Ns represents a number of POs in one PF;

or, wherein the second paging message carries a group-specific discontinuous reception (DRX) cycle and an MBS session-specific identity, and the relevant MBS session information; and the group-specific DRX cycle and the MBS session-specific identity are used for determining the PO corresponding to the terminal device to be paged based on following formulas:

$$(SFN+PF\_offset) \bmod T=(T \text{ div } N)*(MBS\ session\_ID \bmod N); \text{ and}$$

$$i\_s=\text{floor}(MBS\ session\_ID/N) \bmod Ns;$$

where SFN corresponds to a paging frame (PF); PF_offset refers to an offset of the PE; mod represents a remainder operation; T is the group-specific DRX cycle; div represents a rounding division operation; N is a number of paging frames during T; MBS session_ID is the MBS session-specific identity; i_s represents a MBS session-specific PO identity; floor represents a downward rounding operation; and Ns represents a number of POs in one PF.

2. The method as claimed in claim 1, wherein the terminal device monitors the first paging message on an MBS-specific PO.

3. The method as claimed in claim 1, further comprising: receiving, by the terminal device, the multicast downlink data by means of the MBS session.

4. The method as claimed in claim 2, further comprising: calculating the specific PO according to an MBS-specific identity and DRX.

5. The method as claimed in claim 4, wherein the MBS-specific identity and DRX are defined in a protocol, or broadcasted by an access network in system information, or configured for the terminal device by a core network through a NAS message.

6. A radio access network (RAN) device, comprising a processor, and a memory, wherein the memory is configured to store a computer program, and the processor, through calling and running the computer program stored in the memory, to cause the RAN device to:

determine information on a group to which downlink data belongs according to N3 channel information;

determine a terminal device to be paged according to the information and a previously obtained relationship between the group and the terminal device;

receive a second paging message from an access and mobility management function (AMF) device; and send a first paging message via the transceiver to the terminal device at a paging occasion (PO), wherein the first paging message is used for notifying presence of multicast downlink data and carries relevant multicast broadcast service (MBS) session information, wherein the relevant MBS session information comprises group information updated in MBS-related system information block (SIB), and the group information updated in the MBS-related SIB is used for indicating the terminal device to:

in response to being interested in the group information and being in an idle state, enter a connected state and initiate a non-access stratum (NAS) message to activate an MBS session;

in response to being interested in the group information and being in an inactive state, initiate a radio resource control (RRC) resume procedure; and in response to being not interested in the group information, ignore the first paging message;

wherein the second paging message carries a group-specific discontinuous reception (DRX) cycle and a group-specific identity, and the relevant MBS session information; the group-specific identity comprises a radio network temporary identity (RNTI), and the group-specific DRX cycle and the group-specific identity are used for determining the PO corresponding to the terminal device to be paged based on following formulas:

$$(SFN+PF\_offset) \bmod T=(T \text{ div } N)*(Group\_ID \bmod N); \text{ and}$$

$$i\_s=\text{floor}(Group\_ID/N) \bmod Ns;$$

where SFN corresponds to a paging frame (PF); PF_offset refers to an offset of the PF; mod represents a remainder operation; T is the group-specific DRX cycle; div represents a rounding division operation; N is a number of paging frames during T; Group_ID is the group-specific identity; i_s represents a group-specific PO identity; floor represents a downward rounding operation; and Ns represents a number of POs in one PF;

or, wherein the second paging message carries a group-specific discontinuous reception (DRX) cycle and a MBS session-specific identity, and the relevant MBS session information; and the group-specific DRX cycle and the MBS session-specific identity are used for determining the PO corresponding to the terminal device to be paged based on following formulas:

$$(SFN+PF\_offset) \bmod T=(T \text{ div } N)*(MBS\ session\_ID \bmod N); \text{ and}$$

$$i\_s=\text{floor}(MBS\ session\_ID/N) \bmod Ns;$$

where SFN corresponds to a paging frame (PF); PF_offset refers to an offset of the PF; mod represents a remainder operation; T is the group-specific DRX cycle; div represents a rounding division operation; N is a number of paging frames during T; MBS session_ID is the MBS session-specific identity; i_s represents a MBS session-specific PO identity; floor represents a downward rounding operation; and Ns represents a number of POs in one PF.

7. The RAN device as claimed in claim 6, wherein the processor, through calling and running the computer program stored in the memory, to further cause the RAN device to send the first paging message on all POs.

8. The RAN device as claimed in claim 6, wherein the processor, through calling and running the computer program stored in the memory, to further cause the RAN device to receive a message from the AMF device, wherein the message carries a group-/MBS session-specific DRX cycle and a group-/MBS session-specific identity.

9. The RAN device as claimed in claim 8, wherein the message is a paging request message.

10. The RAN device as claimed in claim 8, wherein the message is an N2 message for establishing a connection of the multicast/MBS session service.

11. A terminal device, comprising a processor, and a memory, wherein the memory is configured to store a computer program, and the processor, through calling and running the computer program stored in the memory, to cause the terminal device to:

receive, at a paging occasion (PO), a first paging message sent by a radio access network (RAN) device, wherein the first paging message is used for notifying presence of multicast downlink data and carries relevant multicast broadcast service (MBS) session information; and respond to the first paging message, wherein the relevant MBS session information comprises group information updated in MBS-related system information block (SIB), and the terminal device is further caused to:

in response to being interested in the group information and being in an idle state, enter a connected state and initiating a non-access stratum (NAS) message to activate an MBS session;

in response to being interested in the group information and being in an inactive state, initiate a radio resource control (RRC) resume procedure; and in response to being not interested in the group information, ignore the first paging message;

wherein the PO is determined at the RAN device based on a second paging message sent from an access and mobility management function (AMF) device, wherein the second paging message carries a group-specific identity, a group-specific discontinuous reception (DRX) cycle, and the relevant MBS session information; the group-specific identity comprises a radio network temporary identity (RNTI), and the group-specific identity and the group-specific DRX cycle are used for determining the PO corresponding to the terminal device to be paged based on following formulas:

$$(SFN+PF\_offset) \bmod T=(T \text{ div } N)*(Group\_ID \bmod N); \text{ and}$$

$$i\_s=\text{floor}(Group\_ID/N) \bmod Ns;$$

where SFN corresponds to a paging frame (PF); PF_offset refers to an offset of the PF; mod represents a remainder operation; T is the group-specific DRX cycle; div represents a rounding division operation; N is a number of paging frames during T; Group_ID is the group-specific identity; i_s represents a group-specific PO identity; floor represents a downward rounding operation; and Ns represents a number of POs in one PF;

or, wherein the second paging message carries a group-specific discontinuous reception (DRX) cycle and an MBS session-specific identity, and the relevant MBS session information; and the group-specific DRX cycle and the MBS session-specific identity are used for determining the PO corresponding to the terminal device to be paged based on following formulas:

$$(SFN+PF\_offset) \bmod T=(T \text{ div } N)*(MBS\ session\_ID \bmod N); \text{ and}$$

$$i\_s=\text{floor}(MBS\ session\_ID/N) \bmod Ns;$$

where SFN corresponds to a paging frame (PF); PF_offset refers to an offset of the PF; mod represents a remainder operation; T is the group-specific DRX cycle; div represents a rounding division operation; N is a number of paging frames during T; MBS session_ID is the MBS session-specific identity; i_s represents a MBS session-specific PO identity; floor represents a downward rounding operation; and Ns represents a number of POs in one PF.

12. The terminal device as claimed in claim 11, wherein the processor, through calling and running the computer program stored in the memory, to further cause the terminal device to monitor the first paging message on an MBS-specific PO.

13. The terminal device as claimed in claim 11, wherein the processor, through calling and running the computer program stored in the memory, to further cause the terminal device to receive the multicast downlink data by means of the MBS session.

14. The terminal device as claimed in claim 12, wherein the processor, through calling and running the computer program stored in the memory, to further cause the terminal device to calculate the specific PO according to an MBS-specific identity and DRX.

15. The terminal device as claimed in claim 14, wherein the MBS-specific identity and DRX are defined in a protocol, or broadcasted by an access network in system information, or configured for the terminal device by a core network through a NAS message.

* * * * *